(12) United States Patent
Guignon et al.

(10) Patent No.: US 12,592,028 B2
(45) Date of Patent: Mar. 31, 2026

(54) METHODS AND DEVICES FOR IMMERSING A USER IN AN IMMERSIVE SCENE AND FOR PROCESSING 3D OBJECTS

(71) Applicant: Orange, Issy-les-Moulineaux (FR)

(72) Inventors: Richard Guignon, Châtillon (FR); Sébastien Poivre, Châtillon (FR); Gildas Belay, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 193 days.

(21) Appl. No.: 18/257,410

(22) PCT Filed: Dec. 13, 2021

(86) PCT No.: PCT/FR2021/052288
§ 371 (c)(1),
(2) Date: Jun. 14, 2023

(87) PCT Pub. No.: WO2022/129752
PCT Pub. Date: Jun. 23, 2022

(65) Prior Publication Data
US 2024/0046559 A1 Feb. 8, 2024

(30) Foreign Application Priority Data
Dec. 14, 2020 (FR) ...................................... 2013132

(51) Int. Cl.
*G06F 3/01* (2006.01)
*G06T 3/067* (2024.01)
(Continued)

(52) U.S. Cl.
CPC .............. *G06T 17/00* (2013.01); *G06F 3/013* (2013.01); *G06T 3/067* (2024.01); *G06T 15/20* (2013.01);
(Continued)

(58) Field of Classification Search
None
See application file for complete search history.

(56) References Cited

U.S. PATENT DOCUMENTS

2013/0095924 A1* 4/2013 Geisner ................... A63F 13/21
463/32
2013/0181982 A1* 7/2013 Tasaki .................... B60K 35/22
345/419
(Continued)

OTHER PUBLICATIONS

International Search Report and Written Opinion dated Apr. 19, 2022 for Application No. PCT/FR2021/052288.
(Continued)

*Primary Examiner* — Joni Hsu
(74) *Attorney, Agent, or Firm* — Knobbe, Martens, Olson & Bear, LLP

(57) ABSTRACT

A device for immersing a user in an immersive scene is described. The device sends, to a device for processing 3D objects, a request comprising a position and an orientation of an eye of an avatar of the user in the immersive scene and display parameters for displaying a 3D object in the scene. The device for processing 3D objects determines a two-dimensional image representing a point of view of the eye of the avatar on the 3D object and a position of this image in the scene. This two-dimensional image is displayed in the immersive scene in order to represent the object.

12 Claims, 7 Drawing Sheets

(51) Int. Cl.
    *G06T 15/20*       (2011.01)
    *G06T 17/00*       (2006.01)
    *G06T 19/00*       (2011.01)
    *G06V 10/74*       (2022.01)

(52) U.S. Cl.
    CPC .......... *G06T 19/006* (2013.01); *G06V 10/761*
          (2022.01); *G06T 2215/16* (2013.01)

(56)            References Cited

U.S. PATENT DOCUMENTS

| | | | |
|---|---|---|---|
| 2017/0200304 A1 | 7/2017 | Li | |
| 2018/0330110 A1* | 11/2018 | Nelson | ............... G06Q 30/0601 |
| 2020/0327740 A1 | 10/2020 | Frommhold | |
| 2020/0368616 A1 | 11/2020 | Delamont | |

OTHER PUBLICATIONS

Anonymous. "Rendering (computer graphics)—Wikipedia. the free encyclopedia" Jan. 7, 2014 (Jan. 7, 2014). Retrieved from the Internet: http://en.wikipedia.org/wiki/Rendering_(computer_graphics) [retrieved on Jan. 7, 2015].

\* cited by examiner

[Fig. 1]
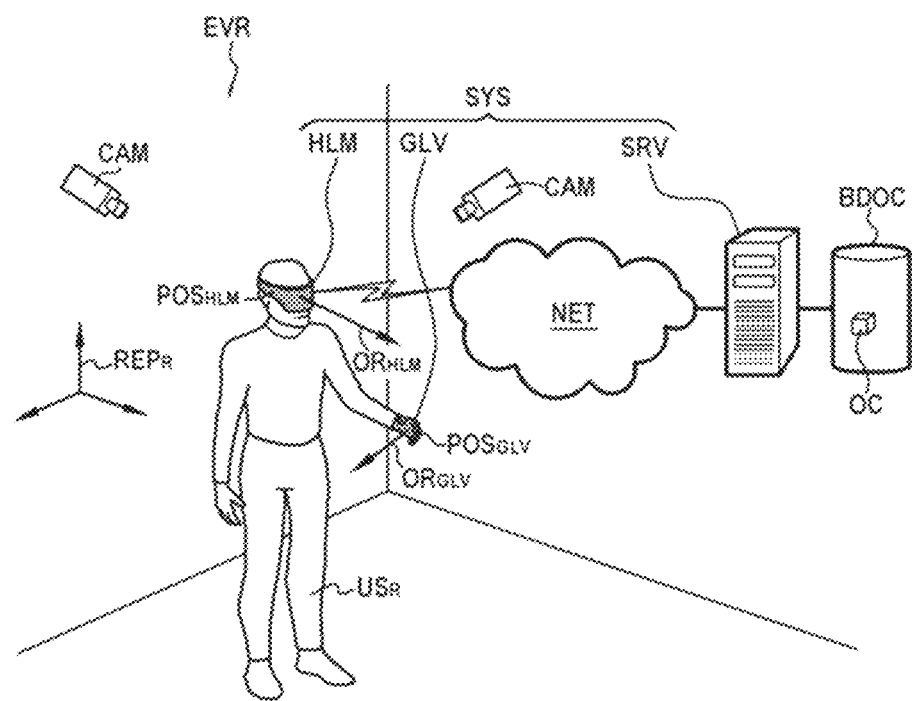
[Fig. 2]
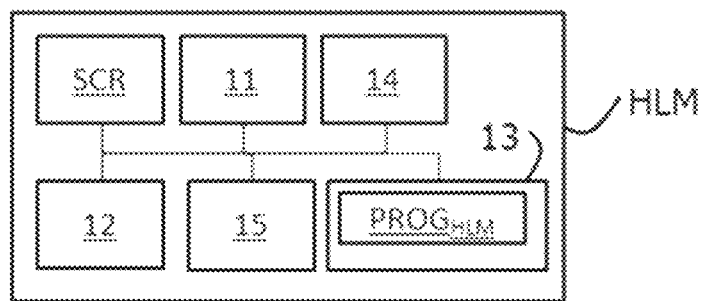

[Fig. 3]
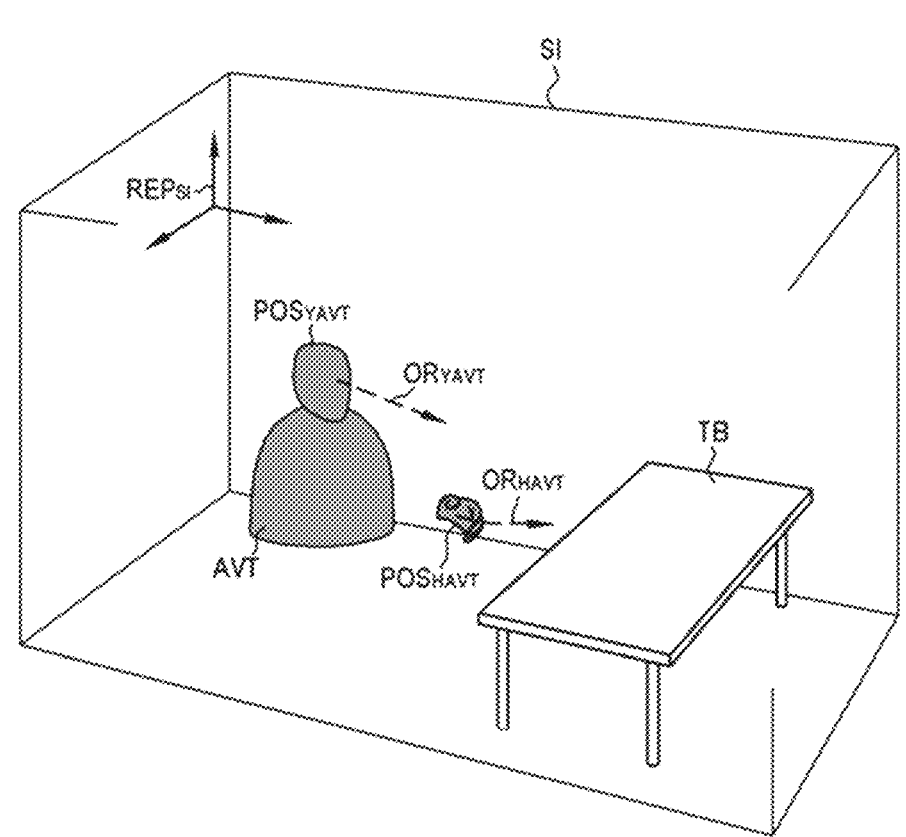

[Fig. 4]
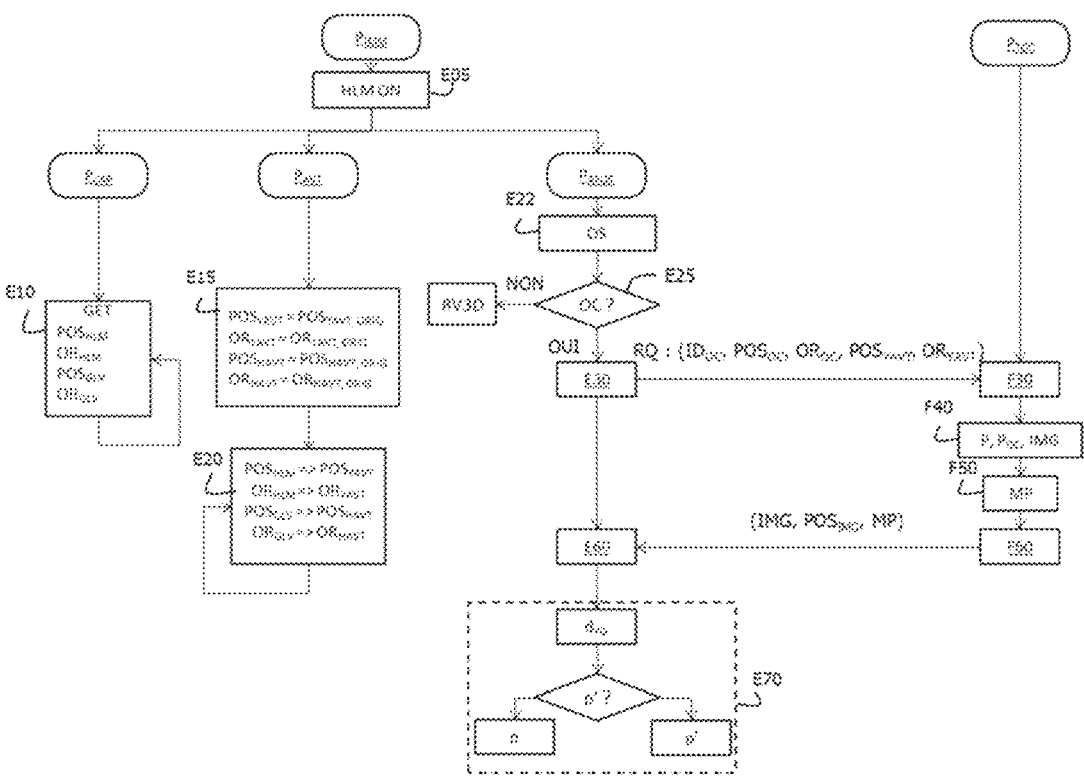
[Fig. 5]
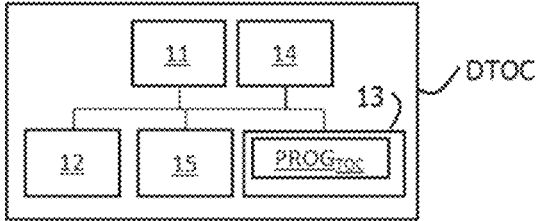

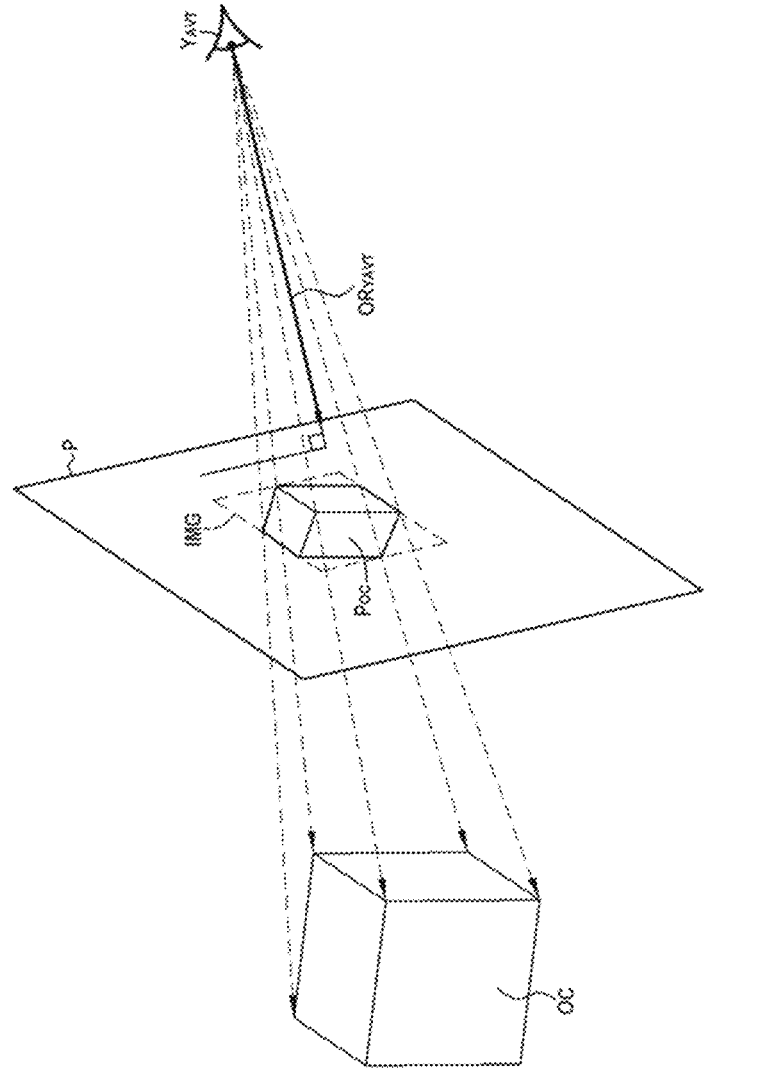
[FIG. 6]

[Fig. 7]
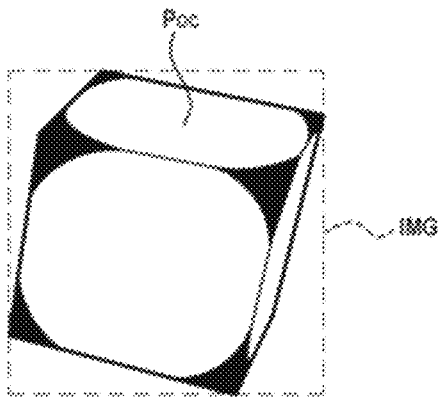
[Fig. 8]
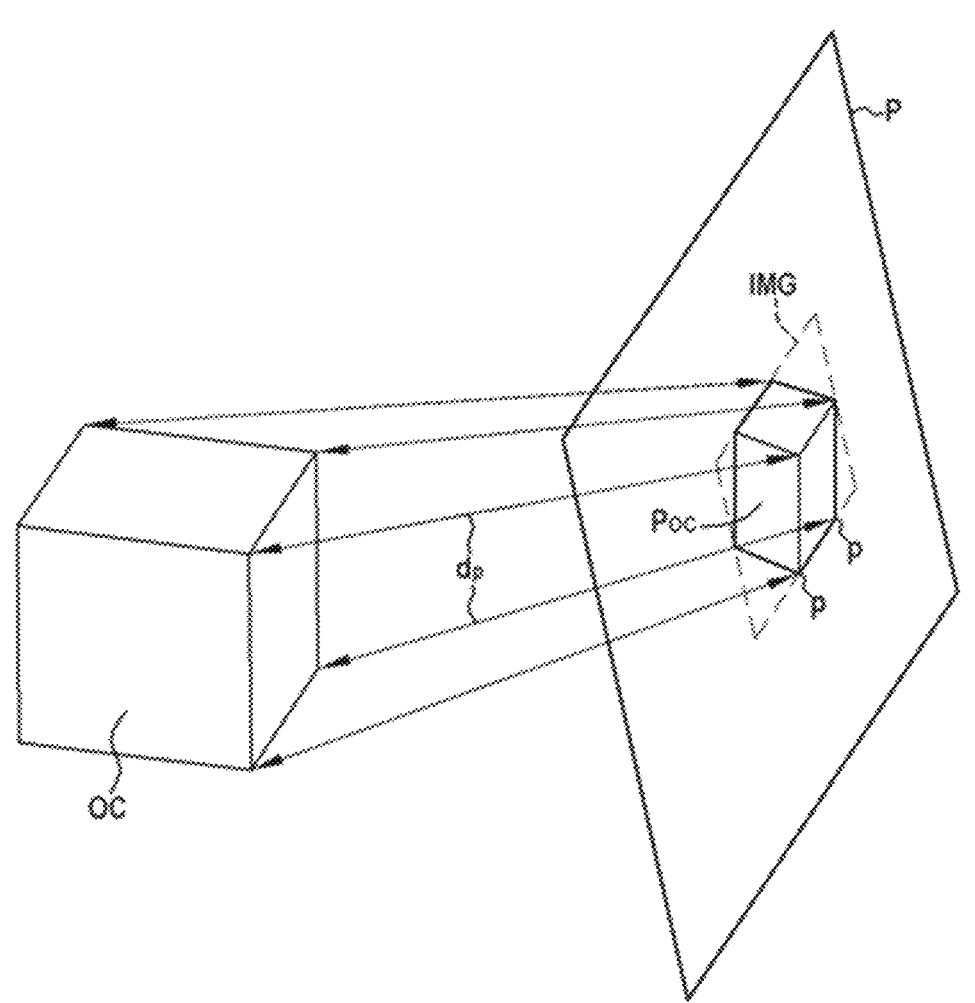

[Fig. 9]
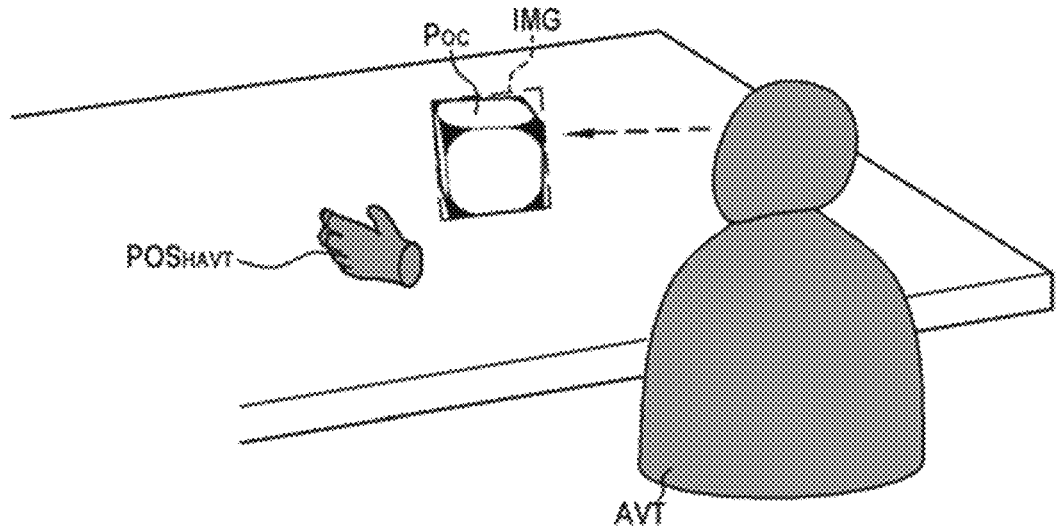
[Fig. 10]
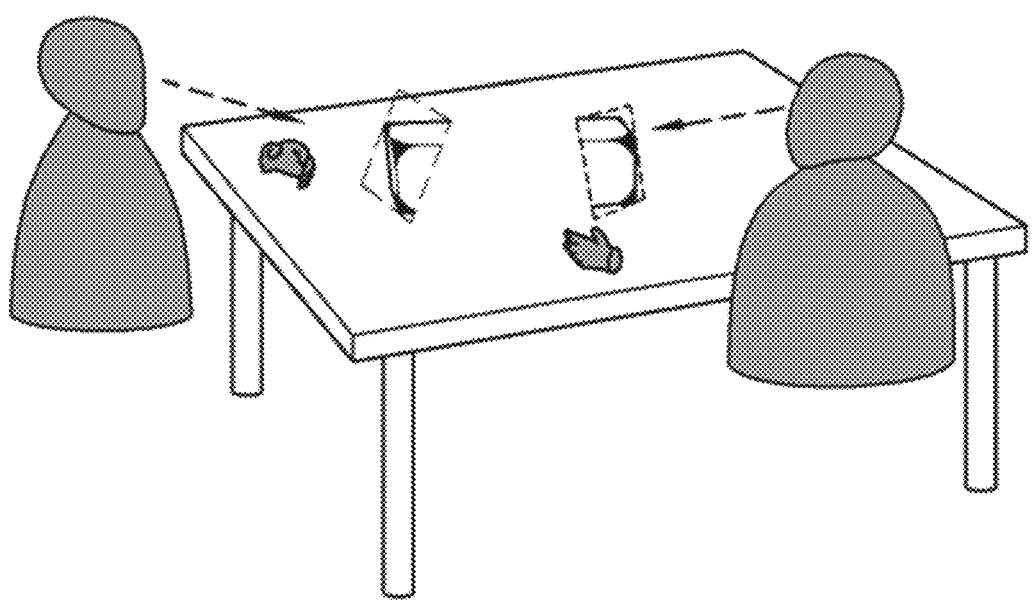

[Fig. 11]
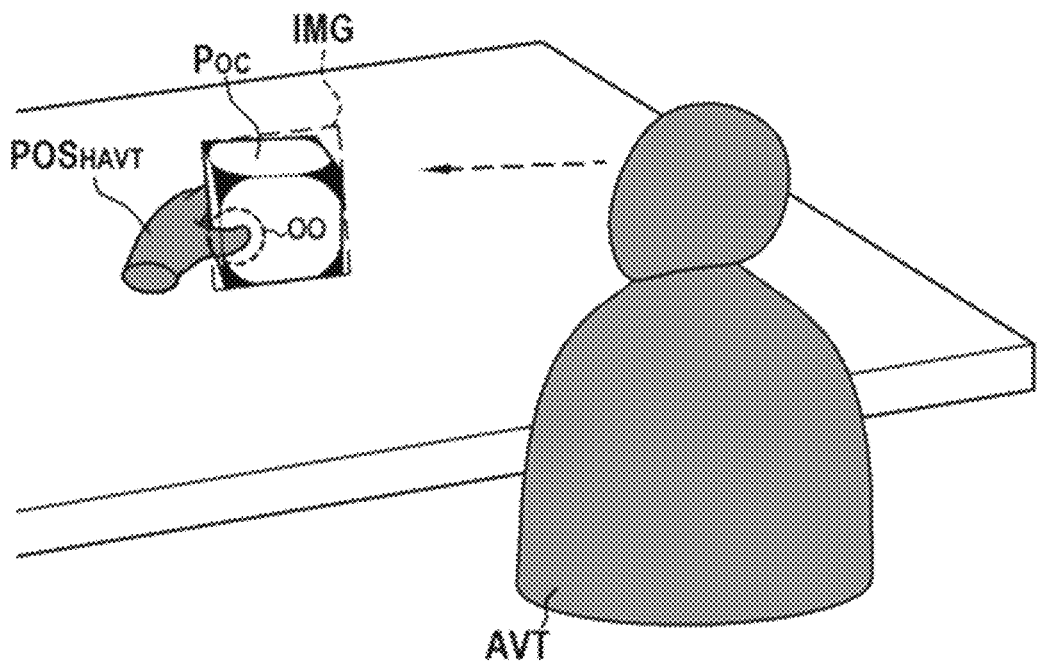
[Fig. 12]
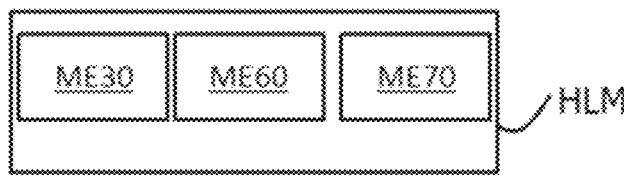
[Fig. 13]
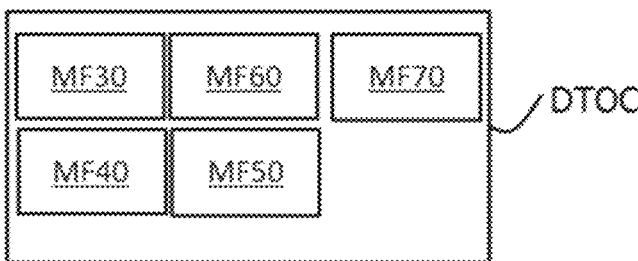

METHODS AND DEVICES FOR IMMERSING A USER IN AN IMMERSIVE SCENE AND FOR PROCESSING 3D OBJECTS

RELATED APPLICATIONS

This application is the U.S. National Phase of Application No. PCT/FR2021/052288 entitled "METHODS AND DEVICES FOR IMMERSING A USER IN AN IMMERSIVE SCENE AND FOR PROCESSING 3D OBJECTS" and filed Dec. 13, 2021, which claims the benefit of French Patent Application No. 2013132, filed Dec. 14, 2020, each of which is incorporated by reference in its entirety.

The present invention belongs to the general field of virtual reality. It more particularly relates to a solution for displaying synthetic objects in an immersive scene.

In this document, "immersion device" designates a device that allows a user to be immersed in an immersive scene displayed on the screen of the device, in particular a device for reproducing a scene in N dimensions, N being greater than or equal to 3.

By way of example, virtual reality headsets and glasses, 3D reproduction terminals or more, such as 3D televisions, 3D projection systems and more used, for example, in movie theaters, virtual reality rooms, etc., holographic devices . . . constitute immersion devices within the meaning of the invention.

Some of these devices allow the user to move in the immersive scene and manipulate synthetic objects modeled in three dimensions.

In a known manner, a complex object can be modeled by a mesh broken down into polygons, for example triangles, each polygon being covered with a texture.

Among these immersion devices, there are the immersion devices called "autonomous" immersion devices which embed the hardware and software means necessary for the processing of the synthetic objects for their display and their manipulation by the user in the immersive scene.

These devices have a computing power and a memory capacity that may not be insufficient to process complex objects, for example objects including a large number of meshes, polygons or textures.

A solution to overcome this difficulty consists in connecting the immersion device to a more powerful device, in shifting the calculations of the synthetic objects (calculation of the positions and orientations of the objects, cast shadows, occlusions, etc.) on this powerful device, in sending a data stream representative of the immersive scene thus calculated to the immersion device for display on its screen.

To avoid the effects of kinetosis, it is essential that the immersive scene adapts to the movement of the user's eyes: the immersion device communicates the information on the positioning of the user's eyes, the immersive scene is recalculated by the remote device based on this information and sent back to the immersion device.

But in practice, this update should be calculated at least 72 times per second and it has been observed that this solution had a latency issue.

DISCLOSURE OF THE INVENTION

The present invention aims to overcome all or part of the drawbacks of the prior art, in particular those set out above.

To this end, the invention relates to a method for immersing a user in an immersive scene, this method being implemented by an immersion device and including:

a step of sending, to a device for processing three-dimensional objects, a request including a position and an orientation of an eye of an avatar of the user in the immersive scene and display parameters for an object modeled in three dimensions in said scene;

a step of receiving a two-dimensional image and a position of said image in said scene calculated by said device for processing three-dimensional objects, said image representing a point of view of the eye of the avatar on said object; and a step of displaying said two-dimensional image in the immersive scene at said position and by taking into account said orientation of the eye of the avatar.

Correlatively, the invention relates to a device for immersing a user in an immersive scene, this device including:

a module for sending, to a device for processing three-dimensional objects, a request including a position and an orientation of an eye of an avatar of the user in the immersive scene and display parameters for an object modeled in three dimensions in said scene;

a module for receiving a two-dimensional image and a position of said image in said scene, calculated by said device for processing three-dimensional objects, said image representing a point of view of the eye of the avatar on said object; and a module for displaying said two-dimensional image in the immersive scene at said position and by taking into account said orientation of the eye of the avatar.

According to a second aspect, the invention relates to a method for processing at least one object modeled in three dimensions, this method including:

a step of receiving, from a device for immersing a user in an immersive scene, a request including a position and an orientation of an eye of an avatar of a user in said immersive scene and display parameters for said object in said scene;

a step of determining a two-dimensional image and a position of said image in said scene, said image representing a point of view of the eye of the avatar on said object; and a step of sending said two-dimensional image and said position of said image in the immersive scene to said immersion device.

Correlatively, the invention relates to a device for processing objects configured to process at least one object modeled in three dimensions, this method including:

a module for receiving, from a device for immersing a user in an immersive scene, a request including a position and an orientation of an eye of an avatar of a user in said immersive scene and display parameters for said object in said scene;

a module for determining a two-dimensional image and a position of said image in said scene, said image representing a point of view of the eye of the avatar on said object; and a module for sending said two-dimensional image and said position of said image in the immersive scene to said immersion device.

The invention also relates to a virtual reality system including a device for immersing a user in an immersive scene and a device for processing objects as presented above and interconnected by a communications network.

The invention is advantageous if the device for processing objects has computing capacities (processor, memory, etc.) greater than those of the immersion device.

Thus, and in general, the invention proposes a virtual reality system in which, for at least one object modeled in three dimensions which should be displayed by the immersion device, there is displayed in the immersive scene, instead of this three-dimensional object (or 3D object), a two-dimensional image of this object, which represents the point of view of the user's eye on the object.

Those skilled in the art will understand that the 3D object as such is not displayed in the immersive scene.

The method implemented by the immersion device for displaying this 3D object, even for a complex 3D object, is very simple since it essentially consists in displaying a two-dimensional image of this object according to a position and an orientation determined by the device for processing objects.

Furthermore, the data stream between the immersion device and the device for processing objects is limited since it essentially consists of a two-dimensional image. Particularly, the recalculated 3D model of the object does not need to be exchanged.

In one embodiment of the method for processing objects, the image calculated by the device for processing objects includes a projection of the object on a plane perpendicular to the orientation of the eye of the avatar and centered on the position of the eye of the avatar.

In one embodiment of the invention, the image sent to the immersion device is exactly constituted by this projection.

In one embodiment of the invention, the image is a rectangle including this projection and transparent pixels.

The fact of sending an image constituted by a rectangle rather than an image of any shape corresponding to that of the projection simplifies the processing of the image by the immersion device.

Very advantageously, the fact that the rest of the rectangular image, in other words the background of the image, is constituted by transparent pixels avoids unnecessarily obscuring other objects that would be behind this background in the immersive scene.

The image must be positioned between the avatar of the user and the position of the complex object in the immersive scene.

In one embodiment of the method for processing objects:

the position of the image is located at a predetermined distance from the eye of the avatar, if this distance is smaller than a distance separating the position of the eye of the avatar and that of the object; or between the position of the eye of the avatar and that of the object in the opposite case.

Thus, the user continues to see the object even if he approaches the object in the immersive scene.

In one embodiment, and as known in virtual reality, if the avatar of the user enters the object, the latter disappears.

In one embodiment, the method for processing objects includes:

a step of calculating, for at least one pixel of said projection, a distance between this pixel and the object, according to a direction defined by the position of the eye of the avatar and this pixel; and a step of sending this distance to the immersion device.

In this embodiment, the immersion method includes:

a step of receiving, for at least one pixel of said image, a first distance;

a step of determining a second distance corresponding to the sum of said first distance and of a distance between said position of the eye of the avatar and said pixel in the immersive scene;

a step of searching for a pixel of another synthetic object of the immersive scene located on a line defined by said position of the eye of the avatar and said pixel and at a distance from the position of the eye of the avatar smaller than said second distance;

said display step comprising the display of said pixel of said image or the display of the pixel of said other synthetic object according to the result of said search.

This embodiment of the invention very advantageously makes it possible to manage the occlusions between the different objects of the synthetic scene (which one conceals which one).

Indeed, in a conventional way, the problems of occlusion between the synthetic objects are managed by knowing the position of the 3D objects in the immersive scene and that of the avatar with respect to these objects.

But, in accordance with the invention, and very advantageously, the device for processing objects calculates the two-dimensional image and its position without taking into account the position of the other synthetic objects of the immersive scene. The calculation is therefore very fast, even for a complex 3D object. But on the other hand, this device cannot manage the occlusion between this object and the other objects of the immersive scene.

Furthermore, the immersion device does not know the position that each pixel of the 3D object would have in the immersive scene, if this object were represented in 3D in the immersive scene as in the conventional way.

Thus, in this particular embodiment of the invention, before displaying a pixel of the two-dimensional image representing the point of view of the object by the user, the immersion device determines the position that a pixel of the 3D virtual object would have if it was displayed in 3D in the immersive scene and whether this pixel would have been obscured or not by another object of the scene.

Very advantageously, this calculation is performed only for the pixels of the two-dimensional image and not for all the points of the 3D object.

The invention also relates to a computer program including instructions for the implementation of the immersion method according to the invention when said program is executed by a computer.

The invention also relates to a computer program including instructions for the implementation of the method for processing objects according to the invention when said program is executed by a computer.

These programs may use any programming language, and be in the form of source code, object code, or intermediate code between source code and object code, such as in partially compiled form, or in any other desirable form.

The invention relates to a computer-readable information or recording medium on which a computer program according to the invention is recorded.

The information or recording medium can be any entity or device capable of storing the program. For example, the medium may include a storage means, such as a ROM, for example a CD ROM or a microelectronic circuit ROM, or a magnetic recording means, for example a hard disk.

On the other hand, the information or recording medium can be a transmissible medium such as an electrical or optical signal, which can be conveyed via an electrical or optical cable, by radio or by other means. The program according to the invention can be particularly downloaded from an Internet-type network.

Alternatively, the information or recording medium may be an integrated circuit in which the program is incorporated, the circuit being adapted to execute or to be used in the execution of the method in question.

BRIEF DESCRIPTION OF THE DRAWINGS

Other characteristics and advantages of the present invention will become apparent from the description given below, with reference to the appended drawings which illustrate an exemplary embodiment devoid of any limitation. On the figures:

FIG. 1 schematically represents a virtual reality system in accordance with the invention.

FIG. 2 schematically represents an example of hardware architecture of an immersion device in accordance with one particular embodiment of the invention;

FIG. 3 represents an example of an immersive scene;

FIG. 4 represents, in the form of a flowchart, the main steps of an immersion method and the main steps of a method for processing objects in accordance with one particular example of implementation of the invention;

FIG. 5 schematically represents an example of hardware architecture of a device for processing objects in accordance with one particular embodiment of the invention;

FIG. 6 represents an example of obtaining a two-dimensional image of an object according to one particular embodiment of the invention;

FIG. 7 represents this two-dimensional image;

FIG. 8 illustrates the distances of a depth matrix according to one particular embodiment of the invention;

FIG. 9 represents the objects of an immersive scene in accordance with the invention with an avatar;

FIG. 10 represents the objects of an immersive scene in accordance with the invention with two avatars;

FIG. 11 represents an example of occlusion in an immersive scene in accordance with the invention;

FIG. 12 represents the functional architecture of an immersion device in accordance with the invention; and FIG. 13 represents the functional architecture of a device for processing objects in accordance with the invention.

DESCRIPTION OF EMBODIMENTS OF THE INVENTION

FIG. 1 schematically represents a virtual reality system SYS in accordance with the invention.

This system 10 includes a device HLM for immersing a user USR in an immersive scene SI and a device DTOC for processing objects interconnected to the immersion device by a communication network NET.

In the embodiment described here, the immersion device HLM is a virtual reality headset.

In the embodiment described here, the device DTOC for processing objects is comprised in a server SRV.

FIG. 2 represents the hardware architecture of the immersion device HLM in one embodiment of the invention. This immersion device includes a screen SCR, a processor 11, a random access memory 12, a read only memory 13, a non-volatile memory 14 and a communication module 15 interconnected by a bus.

The read only memory 13 constitutes a recording medium in accordance with the invention, readable by the processor 11 and on which a computer program $PROG_{HLM}$ in accordance with the invention is recorded, including instructions for the execution of the steps of the immersion method $P_{IMM}$ according to the invention and whose main steps will be described with reference to FIG. 4.

This computer program $PROG_{HLM}$ includes a RV3D module in accordance with the state of the art for displaying, moving and manipulating in the immersive scene SI synthetic objects modeled in three-dimensions (3D objects).

In the example of FIG. 1, the user USR is equipped with the virtual reality headset HLM and a glove GLV. It evolves in a real environment EVR in which there are one or more sensors CAM configured to determine the position and orientation of the virtual reality headset HLM and of the glove GLV.

FIG. 3 represents an example of an immersive scene SI in which an avatar AVT of the user USR can move.

In this example, the immersive scene SI includes three synthetic objects, namely an object TB representing a table, an object representing part of the body of the avatar AVT and an object representing a hand of the avatar AVT.

These synthetic objects are simple within the meaning of the invention because the calculations necessary for their display, their displacement and their manipulation can be performed by the hardware elements of the immersion device HLM, in particular the processor 11, the random access memory 12 and the RV3D module.

The immersive scene SI is projected on the screen SCR of the immersion device HLM.

The images projected on the screen SCR are calculated in real time to adapt to the displacement of the head and therefore to the point of view of the user USR.

Specifically, in the embodiment described here, the images are calculated at least 72 times per second to prevent the user USR from feeling the effect of kinetosis (or motion sickness).

In the embodiment described here, the immersion method $P_{IMM}$ includes a process $P_{CAP}$ to obtain (step E10):

the current position $POS_{HLM}$ and the current orientation $OR_{HLM}$ of the immersion device HLM of the user USR in the reference frame $REP_{CAP}$ linked to the network of sensors; and the current position $POS_{GLV}$ and the current orientation $OR_{GLV}$ of the immersion device HLM of the user USR in the reference frame $REP_{CAP}$.

In the embodiment described here, the immersion method $P_{IMM}$ includes a process $P_{AVT}$ to control:

the position $POS_{YAVT}$ and the orientation $OR_{YAVT}$ of an eye of the avatar AVT; and the position $POS_{HAVT}$ and the orientation $OR_{HAVT}$ of the hand of the avatar AVT in a reference frame $REP_{SI}$ of the synthetic scene.

In a manner known to those skilled in the art, the position and orientation of the eye of the avatar can correspond to those of an eye of the user. The invention can be implemented for one eye or independently for each of the two eyes of the user.

As a variant, the eye of the avatar can correspond to a fictitious point placed between the two eyes of the user.

In the description given below, it will be considered that the position of the eye of the avatar represents, in the immersive scene SI, a point located between the two eyes of the user USR in the real world.

In the embodiment described here, when the immersion device HLM is turned on (step E05), the avatar control process $P_{AVT}$ positions and orients the eye and the hand of the avatar AVT at original positions and according to predetermined original orientations (step E15).

Then, during a general step E20, the avatar control process $P_{AVT}$ controls:

the position $POS_{YAVT}$ and the orientation $OR_{YAVT}$ of the eye of the avatar AVT in the reference frame $REP_{SI}$ according to the position $POS_{HLM}$ and to the orientation $OR_{HLM}$ of the immersion device HLM in the reference frame $REP_{CAP}$; and the position $POS_{HAVT}$ and the orientation $OR_{HAVT}$ of the hand of the avatar AVT in the reference frame $REP_{SI}$ according to the position $POS_{GLV}$ and to the orientation $OR_{GLV}$ of the glove GLV in the reference frame $REP_{CAP}$.

The immersion method $P_{IMM}$ has a process $P_{AFOS}$ to display 3D synthetic objects in the immersive scene SI.

In accordance with the invention, the immersion device HLM operates a different processing depending on whether the 3D object to be displayed is a simple synthetic object or a complex synthetic object.

As indicated previously, the simple synthetic objects 3D can be processed locally by the immersion device HLM, more precisely by its RV3D module.

On the contrary, a complex 3D synthetic object OC is too complex to be able to be processed by the hardware and software elements of the immersion device HLM, in particular the processor 11 and the random access memory 12, and the RV3D module.

In the embodiment described here:

the models of the simple 3D synthetic objects are stored in the read only memory 13 of the immersion device HLM; and the models of the complex 3D synthetic objects are stored in a database BDOC of the server SRV.

To simplify the description and the figures, a complex synthetic object is represented here by a cube. Those skilled in the art will understand that in practice a cube is a simple synthetic object within the meaning of the invention. A complex synthetic object can consist for example of a synthetic object representing a car.

FIG. 5 represents the hardware architecture of the device DTOC for processing objects in one embodiment of the invention. This device includes a processor 21, a random access memory 22, a read only memory 23, a non-volatile memory 24 and a communication module 25 interconnected by a bus.

The read only memory 23 constitutes a recording medium in accordance with the invention, readable by the processor 21 and on which a computer program $PROG_{TOC}$ in accordance with the invention is recorded, including instructions for the execution of the steps of the method $P_{TOC}$ for processing synthetic objects according to the invention and whose main steps will be described with reference to FIG. 4.

The communication means 15 of the immersion device HLM and the communication means 25 of the device DTOC are configured to allow the immersion device HLM and the device DTOC to communicate with each other via the network NET.

It is assumed that during a step E22, the user USR wishes to display a 3D synthetic object OS in the immersive scene.

During a step E25, the immersion device HLM determines whether this synthetic object OS is simple or complex.

If the synthetic object is simple, the result of the test E25 is negative and the 3D synthetic object is displayed by the RV3D module for displaying objects in three dimensions in accordance with the state of the art.

If the synthetic object OS is complex, the result of the test E25 is positive.

The processing of a complex synthetic object OC will now be described in one particular embodiment of the invention. This processing is implemented when the complex object OC must be displayed for the first time or recalculated, typically 72 times per second, to take into account the movements of the head of the user USR, or the manipulation of the synthetic objects by the user.

It is assumed that the complex object OC must be displayed:

at a position $POS_{OC}$ and according to an orientation $OR_{OC}$ in the immersive scene SI;

with a size $SZ_{OC}$.

In the embodiment described here, each complex object is modeled at scale 1, and the display size $SZ_{OC}$ is a number defining a scale factor.

During this step E30, the immersion device HLM sends a request RQ to the device DTOC for processing objects, this request including the position $POS_{YAVT}$ and orientation $OR_{YAVT}$ of the eye of the avatar AVT in the reference frame $REP_{SI}$ of the immersive scene SI and display parameters for the complex object OC in the immersive scene.

In the embodiment described here, the display parameters for the complex object OC include the identifier $ID_{OC}$ of the complex object OC, its position $POS_{OC}$ and its orientation $OR_{OC}$ in the reference frame $REP_{SI}$ of the immersive scene SI and the size $SZ_{OC}$ of the complex object.

This request is received by the device DTOC during a step F30.

As represented with reference to FIG. 6, during a step F40, the device DTOC for processing objects defines a plane P perpendicular to the orientation $OR_{YAVT}$ and positioned between the eye of the avatar AVT and the complex object OC.

In the embodiment described here:

the plane P is located at a predetermined distance $d_{AP}$ from the position $POS_{YAVT}$ of the eye of the avatar, if this distance is smaller than the distance separating the eye of the avatar AVT and the complex object OC; or halfway between the eyes of the avatar AVT and the complex object OC otherwise.

During this step F40, the device DTOC for processing objects performs a projection $P_{OC}$ of the complex object on the plane P, centered on the position $POS_{YAVT}$ of the eye of the avatar AVT.

During this step F40, the device DTOC for processing objects obtains a two-dimensional image IMG whose contour corresponds to the smallest rectangle of the plane P in which the projection $P_{OC}$ can be inscribed.

In the embodiment, the pixels of the two-dimensional image IMG which are not part of the projection $P_{OC}$ of the complex object, in other words the pixels of the background of the image, are transparent.

This two-dimensional image IMG is represented in FIG. 7.

During a step F50, and as represented in FIG. 8, the device DTOC for processing objects calculates, for each pixel p of the projection $P_{OC}$, the distance $d_p$ between this pixel and the complex object OC, according to the direction defined by the position $POS_{YAVT}$ of the avatar AVT and this pixel p. For the pixels p of the image IMG which are not part of the projection $P_{OC}$ of the complex object, this distance $d_p$ is considered infinite.

The device DTOC for processing objects constitutes a matrix of these distances $d_p$ for each pixel of the image IMG, called "depth matrix" MP.

During a step F60, the device DTOC for processing objects sends, in response to the request RQ, to the immersion device HLM:

the two-dimensional image IMG and the position $POS_{IMG}$ of the center of the image in the reference frame SI; and the depth matrix MP.

It will be noted that the immersion device HLM knows the orientation of the two-dimensional image IMG since it is located in a plane P perpendicular to the orientation $OR_{Y_{AVT}}$ of the eye of the avatar AVT.

The immersion device HLM receives this response during a step E60.

FIG. 9 represents the objects of the immersive scene SI as present in the non-volatile memory 14 of the immersion device HLM.

FIG. 10 represents the objects of the immersive scene with two avatars. It is understood that this scene comprises two two-dimensional images, each corresponding to the point of view of a user on the complex object OC.

During a step E70, the frame HLM displays the image IMG in the immersive scene SI.

In the embodiment described here, this display step takes into account the depth matrix MP.

Thus, for each pixel p of the image IMG, the immersion device HLM determines a distance $d_{YO}$ corresponding to the sum of the distance $d_{Yp}$ between the eye of the avatar $Y_{AVT}$ and the pixel p and of the distance $d_p$ comprised in the depth matrix MP for this pixel. This distance corresponds to the distance that would separate the eye of the avatar AVT from the complex object OC if the latter were displayed in 3D in the immersive scene.

The immersion device HLM then determines whether there is a pixel p' of another synthetic object OO of the immersive scene SI located on the line defined by the eye of the avatar $Y_{AVT}$ and the pixel p, at a distance from the eye $Y_{AVT}$ smaller than the distance $d_{YO}$. If this is the case, this means that there would be this other synthetic object (called occluding object) between the eye of the avatar and the complex object OC if the latter were displayed in 3D in the immersive scene.

If the pixel p' exists, the immersion device displays the pixel p' of the occluding object OO, otherwise it displays the pixel p of the image IMG.

FIG. 11 represents the immersive scene SI, the thumb of the hand HAVT of the avatar constituting an occluding object OO within the meaning of the invention.

FIG. 12 represents the functional architecture of an immersion device in accordance with one particular embodiment of the invention. It includes:

a module ME30 configured to send requests to a device for processing three-dimensional objects, a request including a position and an orientation of an eye of an avatar of a user in an immersive scene and display parameters for an object modeled in three dimensions in this scene;

a module ME60 configured to receive a two-dimensional image and a position of this image in the scene, calculated by said device for processing three-dimensional objects, this image representing a point of view of an eye of the avatar AVT on the object; and a module ME70 for displaying this two-dimensional image in the immersive scene at the aforementioned position and by taking into account the orientation of the eye of the avatar.

FIG. 13 represents the functional architecture of a device for processing objects configured to process at least one object and in accordance with one particular embodiment of the invention. It includes:

a module MF30 for receiving, from a device for immersing a user in an immersive scene, a request including a position and an orientation of an eye of an avatar of the user in the scene immersive and display parameters for the 3D object;

a module MF40 for determining a two-dimensional image and a position of this image in the scene, this image representing a point of view of the eye of the avatar on the object;

a module MF60 for sending this two-dimensional image and said position of this image in the immersive scene to the immersion device.

In the embodiment described here, the two-dimensional image determined by the module MF40 includes a projection of the object on a plane perpendicular to the orientation of the eye of the avatar and the device for processing objects includes a module MF50 to calculate, for at least one pixel of this projection, a distance between this pixel and the object, according to a direction defined by the position of the eye of the avatar and this pixel.

What is claimed is:

1. A method for immersing a user in an immersive scene, the method implemented by an immersion device, the method comprising:

sending, to a device for processing three-dimensional objects, a request including a position and an orientation of an eye of an avatar of the user in the immersive scene and display parameters for an object modeled in three dimensions in said scene, the position and orientation of the eye of the avatar being those of an eye of the user or those of a fictitious point placed between two eyes of the user, the display parameters for the complex object including an identifier, a position, an orientation and a size of the complex object in a reference frame of the immersive scene;

receiving a two-dimensional image and a position of said image in said scene calculated by said device for processing three-dimensional objects, said image representing a point of view of the eye of the avatar on said object; and displaying said two-dimensional image in the immersive scene at said position and by taking into account said orientation of the eye of the avatar.

2. The method of claim 1, said method further comprising:

receiving, for at least one pixel of said image, a first distance;

determining a second distance corresponding to a sum of said first distance and of a distance between said position of the eye of the avatar and said pixel in the immersive scene;

searching for a pixel of another synthetic object of the immersive scene located on a line defined by said position of the eye of the avatar and said pixel and at a distance from said position of the eye of the avatar smaller than said second distance;

wherein displaying the two-dimensional image in the immersive scene comprises the display of said pixel of said image or the display of the pixel of said other synthetic object according to the result of said search.

3. A non-transitory computer-readable medium having stored thereon instructions, which, when executed by a processor, cause the processor to implement the method of claim 1.

4. A method for processing at least one object modeled in three dimensions, the method comprising:

receiving, from a device for immersing a user in an immersive scene, a request including a position and an orientation of an eye of an avatar of a user in said immersive scene and display parameters for said object in said scene two eyes of the user, the display parameters for the complex object including an identifier, a position, an orientation and a size of the complex object in a reference frame of the immersive scene;

determining a two-dimensional image and a position of said image in said scene, said image representing a point of view of the eye of the avatar on said object; and sending said two-dimensional image and said position of said image in the immersive scene to said immersion device.

5. The method of claim 4, wherein said image includes a projection of said object on a plane perpendicular to the orientation of the eye of the avatar and centered on the position of the eye of the avatar.

6. The method of claim 5, wherein said image is a rectangle including said projection and transparent pixels.

7. The method of claim 4, wherein said position of the image is located:

at a predetermined distance from said position of the eye of the avatar, if this distance is smaller than a distance separating the position of the eye of the avatar and that of said object; or between the position of the eye of the avatar and said position of the object in the opposite case.

8. The method of claim 4, said method further comprising:

calculating, for at least one pixel of said projection, a distance between said pixel and said object, along a direction defined by said position of the eye of the avatar and said pixel; and a step of sending said distance to said immersion device.

9. A non-transitory computer-readable medium having stored thereon instructions, which, when executed by a processor, cause the processor to implement the method of claim 4.

10. A device for immersing a user in an immersive scene, the device configured to:

send, to a device for processing three-dimensional objects, a request including a position and an orientation of an eye of an avatar of the user in the immersive scene and display parameters for an object modeled in three dimensions in said scene, the position and orientation of the eye of the avatar being those of an eye of the user or those of a fictitious point placed between two eyes of the user, the display parameters for the complex object including an identifier, a position, an orientation and a size of the complex object in a reference frame of the immersive scene;

receive a two-dimensional image and a position of said image in said scene, calculated by said device for processing three-dimensional objects, said image representing a point of view of the eye of the avatar on said object; and display said two-dimensional image in the immersive scene at said position and by taking into account said orientation of the eye of the avatar.

11. A virtual reality system comprising:

the device for immersing a user in an immersive scene of claim 8; and a device for processing objects modeled in three dimensions, the device for immersing a user in an immersive scene and the device for processing objects modeled in three dimensions interconnected by a communications network, the device for processing objects modeled in three dimensions configured to:

receive, from the device for immersing a user in an immersive scene, the request including the position and the orientation of the eye of an avatar of the user in said immersive scene and display parameters for said object in said scene, the position and orientation of the eye of the avatar being those of an eye of the user or those of a fictitious point placed between two eyes of the user, the display parameters for the complex object including the identifier, the position, the orientation and the size of the complex object in the reference frame of the immersive scene;

determine the two-dimensional image and the position of said image in said scene, said image representing the point of view of the eye of the avatar on said object; and send said two-dimensional image and said position of said image in the immersive scene to said immersion device.

12. A device for processing objects, the device configured to process at least one object modeled in three dimensions, the device configured to:

receive, from a device for immersing a user in an immersive scene, a request (RQ) including a position and an orientation of an eye of an avatar of a user in said immersive scene and display parameters for said object (OC) in said scene (SI), the position and orientation of the eye of the avatar being those of an eye of the user or those of a fictitious point placed between two eyes of the user, the display parameters for the complex object including an identifier, a position, an orientation and a size of the complex object in a reference frame of the immersive scene;

determine a two-dimensional image and a position of said image in said scene, said image representing a point of view of the eye of the avatar on said object; and send said two-dimensional image and said position of said image in the immersive scene to said immersion device.

* * * * *